3,290,279
POLYMERIZATION OF ISOPRENE WITH A VCl₃-Al(C₂H₅)₃-DIISOPROPYL ETHER CATALYST
Eric Catterall, Yardley, Birmingham, England, assignor to Dunlop Rubber Company Limited, London County, England, a British company
Filed Jan. 15, 1963, Ser. No. 251,569
Claims priority, application Great Britain, Jan. 31, 1962, 3,579/62
10 Claims. (Cl. 260—94.3)

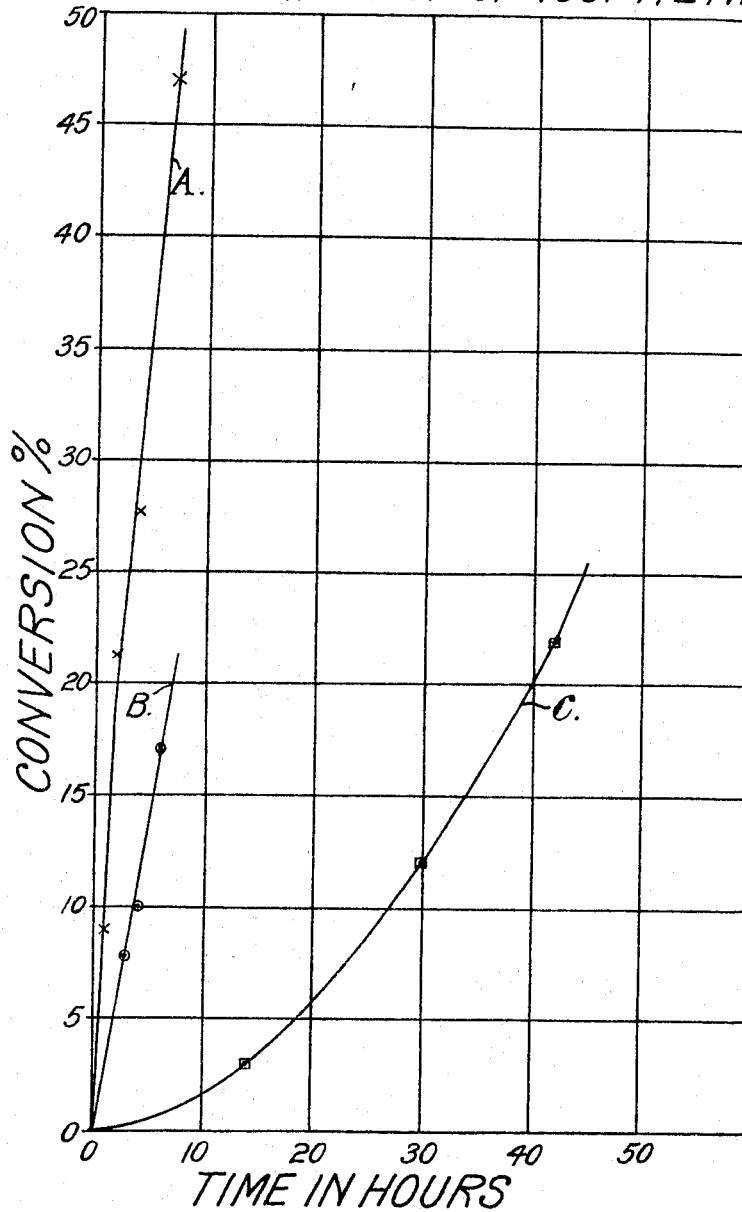

This invention relates to the polymerization of unsaturated aliphatic compounds, and more particularly compounds containing a

group.

According to the present invention, a process for the polymerization of an unsaturated aliphatic compound containing a

group comprises forming a heterogeneous surface-active catalyst by mixing together a vanadium compound and an addition compound of an aluminium alkyl with diisopropyl ether and contacting the aliphatic compound with the said catalyst.

Heterogeneous surface-active catalysts are of the type whereby the polymerization is effected by the absorption of the monomer on the active surface thereof.

The addition compound of an aluminium alkyl and diisopropyl ether referred to above, is prepared by simply mixing at room temperature an aluminium alkyl with diisopropyl ether. Alternatively, the addition compound can be prepared by mixing the aluminium alkyl with the ether prior to addition of the vanadium compound, or in situ after mixing the aluminium alkyl with the vanadium compound. The amount of the diisopropyl ether used to prepare the addition compound can vary within wide limits. For instance, the addition compound can be formed from equimolar amounts of the aluminium alkyl and the diisopropyl ether but it is preferred to employ an excess of the diisopropyl ether. An amount of diisopropyl ether of up to 4 moles per mole of aluminium alkyl can advantageously be employed. Preferably, about 3 moles of diisopropyl ether are employed per mole of aluminium alkyl.

The preferred catalyst consists of a mixture of a vanadium halide and an addition compound of an aluminium alkyl and diisopropyl ether. The preferred halides of vanadium are the chlorides, for example vanadium trichloride and the oxychlorides. Mixtures of vanadium trichloride and vanadium oxytrichloride can be used, if desired.

The preferred aluminium alkyls are those having the formula AlR₃ wherein Al represents aluminium, and R represents an alkyl group containing up to 8 carbon atoms, for example isobutyl, ethyl, isopropyl or octyl.

The proportion of the addition compound used is preferably from 0.5 to 3 percent based on the total weight of the monomer and the surface-active catalyst.

Generally, an amount of up to 10 moles of aluminium alkyl per mole of vanadium compound can be employed, but usually the amount is at least 1.5 moles.

If desired, the surface-active catalyst can be absorbed on cryolite or on another finely-divided filler, for example silica or carbon black. The silica can consist of either a three-dimentional cross-linked network, or a lattice distorted by the presence of an element of variable valency such as chromium or iron.

The polymerization reaction is usually conducted in a liquid medium which acts as a solvent for the monomer, in the absence of moisture and oxygen. The polymerization is usually conducted at atmospheric pressure but it can be conducted at a higher pressure, if desired. The temperature of polymerization can vary within wide limits and it depends to some extent on the monomers being polymerized and on the catalyst being used to effect the polymerization. For instance, the polymerization can be effected at a temperature between room temperature and about 80° C., say for instance 50° C.

Various classes of hydrocarbons or their mixtures which are liquid under the polymerization conditions can be used as the liquid reaction medium. The liquid reaction medium should be chemically-inert to the monomer and the surface-active catalyst. The saturated aliphatic hydrocarbons, alkanes, and cycloalkanes are especially suitable as reaction media and include n-pentane, n-hexane, 2,3-dimethylbutane, n-octane, isooctane, 2,2,4-trimethylpentane, cyclohexane, and dimethyl cyclopentane. Members of the aromatic hydrocarbon series, particularly the mono-nuclear aromatic hydrocarbons, e.g. benzene, toluene, xylene, and mesitylene can be employed and, in addition, other compounds such as ethyl-benzene, ethyl-toluene, and isopropyl-benzene.

The ratio by volume of liquid reaction medium to polymer is generally not more than 3:1. Polymers prepared in accordance with the present invention are usually soluble in the liquid reaction medium.

The process of this invention is particularly suitable when applied to polymerizing conjugated diolefines including unsubstituted dienes, e.g. butadiene, and substituted dienes, e.g. isoprene. Other monomers such as propylene, butene-1, and ethylene, can be polymerized or copolymerized.

The use of a surface-active catalyst formed from a vanadium compound and an addition compound of an aluminium alkyl and diisopropyl ether has important advantages. Firstly, a high polymerization rate is obtained when the catalyst is used. The rate is much higher than when other ethers are used. Secondly, the polymer obtained contains a high proportion of a stereo-regulated fraction. The surface-active catalyst can be employed to good effect in industrial polymerization systems and enables an increase in production of high quality polymers to be attained.

The effect of the use of an addition compound of aluminium triethyl and diisopropyl ether is shown in FIGURE 1 of the attached drawings. An experiment was carried out similar to that described in Example 3 following, in which the polymerization of isoprene was effected employing, as a catalyst, vanadium trichloride and an addition compound of aluminium triethyl and diisopropyl ether. The molar ratio of the ingredients of the catalyst was 1:2:6 for VCl₃:Al(C₂H₅)₃:diisopropyl ether. The percentage conversion at the end of chosen periods was plotted in the form of a graph, and the results, are shown by the line "A." An experiment was carried out employing a molar ratio of VCl₃:Al(C₂H₅)₃:diisopropyl ether of 1:2:2, and the results are shown by the line "B" on the graph. A further experiment was carried out in which the diisopropyl ether was omitted from the catalyst, and the molar ratio of vanadium trichloride:aluminium triethyl was 1:2. The results of this experiment were plotted as line "C." It will be seen from the graph that the use of diisopropyl ether and vanadium trichloride greatly increases the rate of polymerization.

The invention is illustrated in the following examples:

Example 1

This example illustrates the polymerization of isoprene.

Finely-divided vanadium trichloride (0.1701 gm.) was dispersed in 5 ml. SBP nd 0.2975 ml. of aluminium triethyl, added with shaking under dry nitrogen. The mixture was allowed to stand overnight at room temperature. 0.305 ml. of dry isopropyl-ether was then added to the mixture and shaken thoroughly.

The catalyst mixture was charged under nitrogen into a bottle and diluted with 15 ml. of SBP and 10 gm. of isoprene added, and the bottle closed.

The bottle was heated at 50° C. for 1½ hours, being shaken intermittently and at the end of this time, the bottle contained an extremely viscous polymer solution which was just mobile. The polymer solution was allowed to stand overnight for 16 hours at room temperature, at the end of which time the contents had become solid. The polymer was recovered from the solution by the usual techniques, giving a 95 percent yield.

SBP is a commercial aliphatic hydrocarbon solvent consisting primarily of hexane.

Example 2

The procedure described in Example 1 was repeated but the catalyst was prepared from a mixture containing 0.0939 gm. of vanadium trichloride and 0.1642 ml. of aluminium triethyl. After standing for 16 hours, 0.1685 ml. of diisopropyl ether and 10 gm. of isoprene were added, and the solvent to monomer ratio increased to 5 to 1.

The mixture so obtained was heated at 50° C. for 3 hours with occasional shaking, and then left to stand at room temperature for 16 hours.

The polyisoprene was recovered from the mixture in 80% yield.

Example 3

The procedure described in Example 1 was repeated but using a Sutherland reactor charged with a dipsersion of 2.6817 gm. of the vanadium trichloride in 100 ml. of SBP 62/68. 3.76 gm. of aluminium triethyl were added and the whole allowed to mature overnight. 4.82 gm. of diisopropyl ether were added, followed by 1150 ml. SBP 62/68 and 170 gm. of isoprene. After stirring the mixture for approximately 1 minute, the contents of the reactor were allowed to stand for 16 hours at 50° C. and 48 hours at 20° C.

The polyisoprene was recovered from the reaction mixture in a 58 percent yield.

Example 4

A dispersion of 2.5 gm. of the vanadium trichloride in a solution of 3.5 gm. of aluminium triethyl in 10 ml. of SBP 62/68 were allowed to react in a funnel under nitrogen for 16 hours. 4.48 ml. of diisopropyl ether were then added under nitrogen and the whole catalyst mixture vigorously shaken.

This catalyst was transferred under nitrogen to a Sutherland reactor and 200 mls. of isoprene added. The reactor charge was stirred continuously for 19 hours at 50° C.

The polyisoprene was recovered from the reaction mixture in a 59 percent yield.

Examples 5–9

The effect of the incorporation of an ether in the catalyst mixture is clearly shown in the following Table I, which contains the essential features of Examples 1 to 4 and in addition details of other experiments carried out with and without the presence of an ether.

TABLE I

| Ex. | Solvent/Monomer | Catalyst concentration (total on monomer) | Ether | Time (hr.) | Temp. (° C.) | Yield (percent) |
|---|---|---|---|---|---|---|
| 1 | 1.4 | 4.76 | Yes | 1.5<br>16 | 50<br>20 | 95 |
| 2 | 5 | 2.58 | Yes | 3<br>16 | 50<br>20 | 80 |
| 3 | 5 | 3.76 | Yes | 16<br>48 | 50<br>20 | 58 |
| 4 | 5 | 4.4 | Yes | 19 | 50 | 59 |
| 5 | 10 | 4.5 | Yes | 68 | 50 | 57.5 |
| 6 | ¹3 | 4.5 | Yes | 24 | 50 | 58 |
| 7 | 5 | 3 | No | 40 | 50 | 48 |
| 8 | 5 | 5.5 | No | 44 | 50 | 32 |
| 9 | 5 | 4.5 | No | 43 | 50 | 26 |

¹ Initially, increasing to 9 during the reaction.

It can be seen that the use of an ether increases the yield obtainable and allows a shorter reaction time to be employed.

Example 10

This example illustrates the advantage of the use of diisopropyl ether in the formation of an addition compound when compared with various other ethers.

Five experiments were carried out employing a technique similar to that used in Example 3, in which isoprene was polymerized with aluminium triethyl and vanadium trichloride. The aluminium triethyl was complexed with one of the various ethers listed in Table 2. Polymerizations were carried out for 16 hours at 50° C. Other details as to the amount of monomer and solvent, and catalyst constituents are shown in Table 2.

TABLE 2

| | Experiment No. | | | | |
|---|---|---|---|---|---|
| | 1 | 2 | 3 | 4 | 5 |
| Isoprene, ml | 100 | 100 | 100 | 100 | 100 |
| Petrol, ml | 500 | 500 | 500 | 500 | 500 |
| Aluminium triethyl, gm | 1.07 | 1.07 | 1.07 | 1.07 | 1.07 |
| Vanadium trichloride, gm | 1.08 | 1.08 | 1.08 | 1.08 | 1.08 |
| Diisopropyl ether, ml | 1.92 | | | | |
| Diethyl ether, ml | | 1.66 | | | |
| Dichlorodiethyl ether, ml | | | 1.58 | | |
| Anisole, ml | | | | 1.25 | |
| Time, 16 hrs. at 50° C. Conversion to trans-1:4-polyisoprene, percent | 75 | 4 | 1 | 5 | <1 |

It will be seen from the above Table 2 that the use of diisopropyl ether enables a high degree of conversion to the trans-1:4-polyisoprene to be obtained. This is not the case with the other ethers.

Having now described my invention, what I claim is:

1. A process for the preparation of trans-polyisoprene having a high trans-1,4 content comprising forming a heterogeneous surface-active catalyst by mixing together vanadium trichloride, aluminium triethyl, and diisopropyl ether, and contacting isoprene with said surface-active catalyst in a liquid hydrocarbon reaction medium which is chemically inert to the isoprene and the surface-active catalyst, the amount of diisopropyl ether added being sufficient to increase the rate of polymerization of isoprene.

2. A process according to claim 1 wherein the catalyst is prepared by mixing the aluminium triethyl with diisopropyl ether prior to the addition of the vanadium trichloride.

3. A process according to claim 1 wherein the catalyst is prepared by mixing the aluminium triethyl and the vanadium trichloride, and adding diisopropyl ether to the mixture.

4. A process according to claim 1 wherein up to 4 moles of diisopropyl ether are employed per mole of aluminium triethyl.

5. A process according to claim 4 wherein 3 moles of diisopropyl ether are employed per mole of aluminium triethyl.

6. A process according to claim 1 wherein up to 10 moles of aluminium triethyl per mole of vanadium trichloride are employed to produce the heterogeneous surface-active catalyst.

7. A process according to claim 6 wherein at least 1.5 moles of aluminium triethyl per mole of vanadium trichloride are employed to effect the formation of the heterogeneous surface-active catalyst.

8. A process according to claim 1 wherein the amount of the addition compound of aluminium triethyl and diisopropyl ether is from 0.5 to 3 percent by weight of the total weight of the isoprene monomer and the surface-active catalyst.

9. A process according to claim 1 wherein the surface-active catalyst is absorbed on a finely-divided filler material.

10. A process according to claim 1 wherein the isoprene is dissolved in the liquid hydrocarbon compound that is chemically-inert to the isoprene and to the surface-active catalyst.

References Cited by the Examiner

UNITED STATES PATENTS

| 3,054,754 | 9/1962 | Lasky | 260—94.3 |
| 3,116,274 | 12/1963 | Boehm | 260—94.9 |

FOREIGN PATENTS

| 1,242,426 | 8/1960 | France. |
| 834,554 | 5/1960 | Great Britain. |

JOSEPH L. SCHOFER, *Primary Examiner.*

E. J. SMITH, *Assistant Examiner.*